Patented Dec. 15, 1931

1,836,731

UNITED STATES PATENT OFFICE

LEO SCHLECHT AND HANS ROETGER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

DENATURED ALCOHOL

No Drawing. Original application filed October 11, 1928, Serial No. 311,953, and in Germany August 2, 1928. Divided and this application filed June 29, 1929. Serial No. 374,941.

The present application has been divided out from our copending application Ser. No. 311,953, filed October 11, 1928.

For the production of condensation products from acetylene and ammonia, it has also been proposed to employ apart from metal oxides, which can be reduced only with difficulty, catalytic substances consisting of incompletely reduced metallic compounds, such as ferrous oxid. In this connection it was expressly stated that only such catalysts might be used in which no reduction to the metallic state occurs, whether prior to use or under the reducing action of acetylene, since such reduction lowers the yield of condensation products.

We have now found that condensation products from acetylene and ammonia can be prepared in an advantageous manner by passing mixtures of the said gases or gases containing the same over catalytic substances containing such metals in the free state as do not assist the formation of carbon from acetylene to more than a slight extent, if at all. Such metals are the metals of the second subgroup of the first group to the sixth group of the periodic system and especially zinc, cadmium or gold, preferably in admixture with other substances, especially such metal compounds as are also catalytic, such as metal oxids. The metals of the iron group and also copper, and finely divided palladium or platinum cannot be employed, since they powerfully assist the decomposition of acetylene whereby losses and other disadvantages occur. Palladium and platinum can, however, be employed provided they exhibit a suitable character as regards surface, i. e., they are employed in a compact state. Apart from a very long working life, the metalliferous catalytic substances possess the particular advantage over those already known, in that they furnish good yields at temperatures at which, for example, the known combinations of oxids have not begun to act. Thus with the described catalytic substances very good yields are obtained of heterocyclic compounds, principally consisting of pyridine homologues at as low temperatures as about 250° C. A condensate with a particularly high content of pyridine homologues is obtained by employing a catalyst, the active component of which consists of one or more of the aforesaid metals singly.

A suitable method of preparing the catalytic substances comprising several active substances consists in impregnating a highly porous carrier with solutions of mixtures of salts which, on being heated in a reducing atmosphere, undergo conversion into oxids on the one hand and finely divided metals on the other hand. The components of the desired catalytic substance may, however, be mixed in the form of their oxids by trituration and making into paste with water, or they may be precipitated conjointly from solutions of their salts and the mixture then treated with reducing agents such as gases having a reducing effect as for example hydrogen. Catalytic substances of the described composition can also be obtained by impregnating suitable sparingly soluble components with readily soluble components, followed by a reducing treatment.

It is advisable to preheat the gaseous mixture prior to its admission into the contact chamber. The temperatures employed in the process range generally between 200° and 600° C., but in many cases the best results are obtained at temperatures between 250° and 400° C. If desired, the process may be performed also at an elevated pressure as for example up to 3 atmospheres with acetylene and ammonia alone.

The resulting condensation products are particularly suitable for use as denaturing agents for alcohols (such as ethyl alcohol). The condensation products, which according to the temperature at which they are produced, consist chiefly of methylated pyridines (such as picoline, lutidine and collidine) in addition to more or less of acetonitrile and traces of pyridine, have a repellant smell and taste and dissolve readily in alcohol without turbidity occurring when such solution is diluted with water. Moreover it is impossible to purify alcohol, denatured with these agents in any easily employed manner such as by filtration through active charcoal, or by distillation, or to mask the objectionable smell and taste completely by other strong-smelling or tasting substances.

In some cases, according to the purpose for which the denatured liquid is intended, it is advisable to employ only a certain fraction of the condensation product such as that passing over between 100° and 150° C. or to add other substances to the denaturing agent, as for example, substances containing sulphur such as thiophene, mercaptan and the like, or mixtures thereof, such as can be obtained by acting upon acetylene or another unsaturated hydrocarbon with gaseous or vaporous sulphur compounds or by passing the aforesaid hydrocarbons at a high temperature over solid sulphur compounds.

The nature of the invention will be further described with reference to the following examples, but the invention is not restricted to these examples.

Example 1

Active silica is impregnated with a solution of aluminium nitrate and cadmium nitrate, the mass being then dried, and treated with dry hydrogen at 400° C. for 12 hours. A mixture of acetylene and ammonia passed over this catalyst at 250° C. will furnish continually for days high yields of liquid condensation products, whereas, with aluminium oxid alone, under the same conditions and at the same temperature, no condensate is obtained.

Example 2

Zinc oxid is made into a suspension with a dilute solution of gold chlorid, and dried in a reducing atmosphere, and a mixture of equal volumes of acetylene and ammonia is passed over this catalyst at 450° C. The yield of liquid condensation products is almost double the amount obtained with zinc oxid alone under otherwise equal conditions.

Example 3

Silica gel is soaked with a solution of cadmium nitrate and then exposed to a current of hydrogen at about 300° C. for several hours. A mixture of equal parts of ammonia and acetylene is passed at from 300° C. to 350° C. over the catalyst prepared in the aforesaid manner whereby a condensate is obtained 80 per cent of which consists of pyridines, the main portion of which consists of picolines.

Example 4

A mixture of gases obtained by the electrothermic decomposition of a natural gas in the presence of hydrogen and consisting of 7 parts by volume of hydrogen, 7 parts by volume of methane and 1 part by volume of acetylene is mixed with 1 part by volume of ammonia and then passed over a catalyst prepared in accordance with Example 3. On cooling the reaction products a condensate is obtained which consists mainly of pyridines. The remaining gases can be subjected again to electrothermic decomposition and passed over the catalyst after adding ammonia. Also other gases containing acetylene such as those obtainable by the action of an electric arc on coke oven gas, can be employed with similar good results.

Example 5

A pure 96 per cent solution of alcohol is denatured with 1 per cent of the crude condensate obtained by the catalytic condensation of acetylene with ammonia at 350° C. The denatured alcohol burns with a non-smoky flame. On being diluted with water down to an alcohol content of 40 per cent, no turbidity occurs. The bitter taste and characteristic smell persists after the dilution and also after distillation and even after filtration through active charcoal. The denaturing effect can be increased by adding 2 per thousand of a fraction boiling below 150° C. of a product obtainable by passing a mixture of acetylene and hydrogen at 350° C. over granular pyrites and consisting mainly of thiophenes and similar heterocyclic sulphur-bearing compounds and some mercaptans.

We claim:

1. As a composition of matter denatured alcohol containing a small percentage of a synthetic mixture of acetonitrile, pyridine and its homologues and of a minute quantity of an organic, heterocyclic sulphur-bearing substance.

2. As a composition of matter denatured ethyl alcohol comprising about 1 per cent by volume of a synthetic mixture of acetonitrile, pyridine and its homologues and about 2 per thousand of a heterocyclic sulphur-bearing organic compound.

3. As a composition of matter, ethyl alcohol denatured with about 1 per cent by volume of the crude condensate obtained by the catalytic condensation of acetylene with ammonia at about 350° C. and containing acetonitrile, pyridine and its homologues, and about 2 per thousand of a fraction boiling below 150° C. of a produce obtainable by passing a mixture of acetylene and hydrogen at about 350° C. over pyrites and containing heterocyclic sulphur-bearing organic compounds.

In testimony whereof, we affix our signatures.

LEO SCHLECHT.
HANS ROETGER.